US008653008B2

(12) United States Patent
Selle et al.

(10) Patent No.: US 8,653,008 B2
(45) Date of Patent: Feb. 18, 2014

(54) WELL TREATMENT (75) Inventors: Olav Martin Selle, Stavanger (NO); Amare Mebratu, Stavanger (NO); Harry Montgomerie, Aberdeen (GB); Ping Chen, Aberdeen (GB); Thomas Hagen, Stavanger (NO)

(73) Assignees: Champion Technologies Ltd., Aberdeen (GB); Halliburton Energy Services, Inc., Duncan, OK (US); StatoilHydro ASA, Stavanger (NO)

( * ) Notice: Subject to any disclaimer, the term of this patent is extended or adjusted under 35 U.S.C. 154(b) by 264 days.

(21) Appl. No.: 12/664,023

(22) PCT Filed: Jun. 11, 2008

(86) PCT No.: PCT/GB2008/050432
§ 371 (c)(1), (2), (4) Date: Mar. 4, 2010

(87) PCT Pub. No.: WO2008/152419
PCT Pub. Date: Dec. 18, 2008

(65) Prior Publication Data
US 2010/0167963 A1 Jul. 1, 2010

(30) Foreign Application Priority Data
Jun. 12, 2007 (GB) .................................. 0711342.6

(51) Int. Cl.
*C09K 8/52* (2006.01)
*E21B 43/26* (2006.01)
*C09K 8/38* (2006.01)
*C09K 8/70* (2006.01)
*C09K 8/94* (2006.01)

(52) U.S. Cl.
CPC ... *C09K 8/52* (2013.01); *C09K 8/38* (2013.01); *C09K 8/70* (2013.01); *C09K 8/94* (2013.01); *C09K 8/703* (2013.01); *Y10S 507/927* (2013.01)
USPC ........................... 507/90; 507/927; 166/308.6

(58) Field of Classification Search
CPC ........................................................ C09K 8/38
USPC .................................. 507/90, 927; 166/308.6
See application file for complete search history.

(56) References Cited

U.S. PATENT DOCUMENTS

| | | | |
|---|---|---|---|
| 4,039,459 A | 8/1977 | Fischer et al. | |
| 4,133,773 A | 1/1979 | Simmons | |
| 4,565,647 A * | 1/1986 | Llenado | 516/14 |
| 4,681,164 A | 7/1987 | Stacks | |
| 4,737,296 A * | 4/1988 | Watkins | 507/202 |
| 4,741,844 A * | 5/1988 | Posey, Jr. | 507/254 |
| 4,980,077 A | 12/1990 | Morris et al. | |
| 5,181,567 A * | 1/1993 | Shuler | 166/279 |
| 5,183,112 A | 2/1993 | Paul et al. | |
| 5,207,932 A | 5/1993 | Norman et al. | |
| 5,219,479 A | 6/1993 | Mathiesen et al. | |
| 5,711,801 A | 1/1998 | Chatterji et al. | |
| 5,830,831 A * | 11/1998 | Chan et al. | 507/211 |
| 6,210,476 B1 | 4/2001 | Chatterji et al. | |
| 6,555,505 B1 | 4/2003 | King et al. | |
| 6,851,433 B1 | 2/2005 | Gross et al. | |
| 7,077,219 B1 | 7/2006 | Chatterji et al. | |
| 7,134,497 B1 | 11/2006 | Chatterji et al. | |
| 7,464,754 B1 * | 12/2008 | Decker et al. | 166/263 |
| 2002/0055439 A1 | 5/2002 | Palmer et al. | |
| 2004/0011527 A1 * | 1/2004 | Jones et al. | 166/304 |
| 2005/0250666 A1 | 11/2005 | Gatlin et al. | |
| 2006/0054324 A1 | 3/2006 | Sullivan et al. | |
| 2006/0137879 A1 * | 6/2006 | Chan | 166/307 |

FOREIGN PATENT DOCUMENTS

| | | |
|---|---|---|
| EP | 0 305 611 A1 | 3/1989 |
| GB | 2 413 811 A | 11/2005 |
| WO | WO 03/036021 A2 | 5/2003 |
| WO | WO 2005/100534 A2 | 10/2005 |

OTHER PUBLICATIONS

MSDS of Gyptron SD250 by Logichem 2002, 2004.*

* cited by examiner

*Primary Examiner* — Aiqun Li
(74) *Attorney, Agent, or Firm* — Dickstein Shapiro LLP (57) ABSTRACT

A method for delivering a scale treatment agent to a hydrocarbon producing system. The method includes the steps of contacting the system with a foam comprising the scale treatment agent, and shutting the scale treatment agent in the system for at least 0.5 hour.

13 Claims, 5 Drawing Sheets

WELL TREATMENT

This is a 371 of International Application No. PCT/GB2008/050432, filed Jun. 11, 2008, which claims priority to GB0711342.6, filed Jun. 12, 2007.

This invention relates to a method for delivering a scale treatment agent to a hydrocarbon producing system and, in particular to a method enabling improved placement of scale treatment agents within a hydrocarbon well. The invention further concerns a method for the treatment or prevention of scale in a hydrocarbon producing system, to use of a foam to deliver a scale treatment agent and to novel foams comprising a scale treatment agent for use in these methods.

During the operation of a hydrocarbon well (i.e. a gas or oil well) various down-hole problems can arise including the deposition of scale which inhibits the hydrocarbon flow. Scale is a water-related problem which arises as a result of the co-mingling of incompatible aqueous fluids in the formation (i.e. the rock). For example, where sea water is injected into a subterranean formation to drive oil through the formation into a producer well hole, differences in the nature of the ions present in the injection water and that already present in the formation may cause the precipitation of metal salts. In the North Sea, typical scale problems are related to the formation of inorganic salts such as $BaSO_4$, $SrSO_4$, $CaSO_4$ and $CaCO_3$. These salts precipitate as scale which, if left untreated, causes scaling of subsurface and surface production equipment and/or tubing and, eventually, blockage of the well hole. Comingling of incompatible aqueous fluids usually occurs within the near well bore area of a subterranean formation. The severity of the problem is highly dependent on the field operating conditions, which can vary from mild scaling tendencies to the extreme.

Typically, to prevent scale from forming in the system, a chemical inhibitor is injected continuously and/or by periodic squeeze treatments. Alternatively, and/or additionally, a scale dissolver may be injected into the system to dissolve any scale already present therein.

To carry out such treatments intended to protect the critical near well bore area, squeeze treatments are normally the preferred option. In a squeeze treatment, a solution of scale inhibitor or dissolver is injected into the formation through a producer well hole after a pre-flush. After a shut-in, well production is then resumed. Ideally the scale inhibitor is leached or washed back to the surface of the formation by the production water at a required minimum concentration to prevent or reduce scale formation both in the well and in the near well bore area.

There are, however, disadvantages in the use of squeeze treatments. The success of a squeeze treatment in preventing or removing scale, depends on its placement efficiency. During treatment of an oil well, scale dissolvers and/or scale inhibitors should be placed such that all potentially productive zones are provided with a sufficient quantity of the treatment liquid. If, however, significant permeability, pressure, or formation damage variations are present in the formation to be treated, squeeze treatment fluid will enter the zones with the higher permeability, least formation damage or least formation pressure leaving little liquid to treat what may be potentially the most productive zone.

To achieve a more uniform liquid coverage, the original or natural flow distribution across the formation often needs to be altered. The methods used to alter this flow distribution are called "diversion" methods. The purpose is to divert the flow of treatment liquid from one portion of the formation being treated to another.

Conventional diversion techniques are, however, costly and often only achieve limited success with squeeze treatment liquids. Mechanical diversion techniques are often complicated and expensive and are generally limited to cased hole environments. Diversion agents such as polymers and suspended solid materials may alternatively be used. These agents are typically pumped into the formation with the aim of sealing off intervals of higher permeability and diverting treatment liquid that is subsequently introduced into lower permeability regions. In practice, however, the diverting action of these agents is often difficult to predict and control, especially during the treatment of horizontal intervals. Moreover the diversion agents may themselves cause formation damage.

Diversion is particularly difficult to achieve with squeeze treatment liquids which comprise a large volume and weight of liquid, particularly in reservoirs having low pressure. Another problem encountered with squeeze treatments employing large volumes of brine is that it can be troublesome to subsequently restart production after the squeeze is completed. This is due to difficulties in removing the large volume of heavy brine from the well. It is of course also highly undesirable for economic reasons for production to be stopped for any significant amount of time, thus time consuming pumping operations are unfavorable.

Thus there is still a need for alternative methods of squeeze treatment which remove and/or prevent scale from a hydrocarbon producing system, and in particular, for methods which deliver scale treatment agents to all potentially productive zones of a hydrocarbon system including, for example, areas having low permeability, high pressure and/or formation damage. In addition such methods should preferably be environmentally friendly.

It has now been found that scale inhibitors and scale dissolvers can advantageously be delivered (e.g. injected) by squeeze treatment into a hydrocarbon well in the form of a foam. By use of a foam, it has been found that the scale treatment agent can be more readily diverted e.g. from high permeability zones to low permeability zones and from low pressure to high pressure zones than squeeze treatment liquids. Thus the squeeze treatment foams that have now been discovered enable scale treatment agents to be placed or distributed throughout the hydrocarbon well. Moreover the use of a foam allows the total weight of treatment liquid introduced into a well to be minimized so that restarting the well after treatment is much more straightforward.

Foams have previously been used in a few oil well treatments such as dewatering, cementing, hydraulic fracturing, fracture acidizing and sand control treatments. The use of foams in oil well treatments is, for example, disclosed in WO2005/100534, U.S. Pat. No. 7,077,219 and US 2004/0054324. Foams have additionally been used during drilling operations (see for example, U.S. Pat. No. 4,039,459 and GB-A 2413811).

Foams have also been used in diversion strategies. In such methods a foam is created and is used to plug the well bore of a formation so that when a treatment fluid is subsequently applied it is forced into a specific volume of the formation.

The use of a foam for the specific delivery of a scale treatment agent such as a scale inhibitor and/or scale dissolver by a squeeze treatment into a hydrocarbon producing system has not, however, previously been disclosed. This is because scale treatment agents need to be in solution in order to work thus their delivery in the form of a foam appeared precluded. The foams of the present invention overcome this problem by collapsing to liquid shortly after delivery (i.e. the foams of the present invention act as a delivery vehicle for solutions of scale treatment agents). The foams of the present invention are therefore entirely different from those foams used in conventional diversion strategies since they comprise scale treatment agent and collapse to liquid shortly after delivery whereas the foams used in diversion strategies do not themselves contain treatment agent and they must be stable over prolonged periods of time in order to provide a plug.

Thus, viewed from a first aspect the invention provides a method for delivering a scale treatment agent to a hydrocarbon producing system, said method comprising: contacting said system with a foam comprising said scale treatment agent; and shutting said scale treatment agent in said system for at least 0.5 hour.

Alternatively viewed, the invention provides a method for the treatment or prevention of scale in a hydrocarbon producing system, said method comprising: contacting said system with a foam comprising a scale treatment agent; and shutting said scale treatment agent in said system for at least 0.5 hour.

In a preferred embodiment of the methods of the present invention, said methods comprise: identifying a hydrocarbon producing system in need of treatment to remove and/or prevent scale; contacting said system with a foam comprising a scale treatment agent; and shutting said scale treatment agent in said system for at least 0.5 hour.

In a further preferred embodiment of the methods of the present invention, the scale treatment agent is a scale inhibitor, scale dissolver or mixture thereof.

Viewed from another aspect, the invention provides the use of a foam to deliver a scale treatment agent (e.g. a scale dissolver, a scale inhibitor or mixture thereof) to a hydrocarbon producing system (e.g. to remove and/or prevent scale), wherein said scale treatment agent is shut into said system for at least 0.5 hour.

Viewed from a still further aspect, the invention provides use of a scale treatment agent (e.g. a scale dissolver, a scale inhibitor or a mixture thereof) in the manufacture of a foam for delivery to a hydrocarbon producing system (e.g. to remove and/or prevent scale), wherein said scale treatment agent is shut into said system for at least 0.5 hour.

Viewed from yet another aspect, the invention provides a foam (e.g. a squeeze treatment foam) comprising a scale treatment agent, a gas, a foaming agent and water.

A kit for the preparation of a foam (e.g. a squeeze treatment foam) as hereinbefore described comprising: (i) a first container comprising an aqueous solution or dispersion of scale treatment agent; (ii) a second container comprising a gas; and (iii) a foaming agent contained in either said first container and/or in a third container forms a further aspect of the invention.

As used herein the term "scale" is intended to encompass any precipitate which may be formed within a hydrocarbon (i.e. oil or gas) producing system. In hydrocarbon producing systems, typical examples of scale include sulphate and carbonate salts of group I and group II metals, e.g. $BaSO_4$, $SrSO_4$, $CaSO_4$ and $CaCO_3$. In preferred methods of the invention $BaSO_4$ scale is removed and/or prevented.

The term "hydrocarbon producing system" is used herein to encompass the subterranean formation (e.g. rock) from which hydrocarbon is extracted as well as the equipment used in the extraction process. This equipment includes both subsurface and surface equipment (e.g. tubes, pipes, pumps, valves, nozzles, storage containers, screens, etc). In a preferred aspect of the present invention the scaling of hydrocarbon extraction equipment is inhibited or prevented.

The term "squeeze treatment" is used herein to denote a treatment wherein a treatment agent is introduced into a formation and shut-in for at least 0.5 hour prior to putting the well back onto production. During shut-in no material is introduced into, or taken out of, the well, i.e. the well is closed. In a preferred squeeze treatment the treatment agent is shut-in for at least 1 hour, more preferably at least 2 hours, e.g. 0.5-12 hours prior to putting the well back onto production.

In a preferred squeeze treatment, an overflush is applied after introduction of the treatment agent to push the agent into the formation. In another preferred squeeze treatment, a preflush is applied before introduction of the treatment agent. A preflush may, for example, be used to wet the surface of the formation thereby enhancing retention of the scale treatment agent.

As used herein the term "foam" refers to a mass of bubbles of gas in a matrix of liquid (e.g. water). The term "foam" is readily understood by those skilled in the art.

As used herein the term "scale treatment agent" refers to any agent that dissolves, removes, inhibits or prevents scale. Preferred scale treatment agents are scale inhibitors and scale dissolvers.

The foams used in the present invention preferably comprise a gas. The gas present in the foams is preferably air or nitrogen, particularly preferably nitrogen. The gas is present in a sufficient amount to foam the scale treatment agent, e.g. scale inhibitor and/or scale dissolver. Typically the gas will comprise 10-90% by volume, more preferably 40-80% by volume, e.g. 50-75% by volume of the foam. The amount of gas present in a foam is sometimes referred to as "foam quality". As used herein, the term "foam quality" means the volume percentage of gas in the foam as it is introduced into, or produced, in the hydrocarbon formation.

Foaming agent present in the foams of the invention is preferably a surfactant, especially a foaming and foam stabilising surfactant. Such surfactants are well known in the art. Preferably, the foaming agent does not emulsify water and oil. Such foaming agents are advantageous as they do not interfere with the separation of hydrocarbon and produced water at the surface.

The foams of the present invention may comprise any conventional foaming and foam stabilising surfactant. Representative examples include ethoxylated alcohol ether sulfates, alkyl or alkene amidopropyl betaines and alkyl or alkene amidopropyl dimethyl amine oxides. Suitable foaming agents are commercially available. For instance, CFA-S, AQF-2, HOWCO-SUDS and HC-2 are foaming agents that are commercially available from Halliburton Energy Services. Another suitable foaming agent is ESTISURF GS60 which is commercially available from Kraft Chemicals, Norway.

Particularly preferred foaming agents for use in the present invention are alkyl polyglycosides. Preferred alkyl polyglycosides are those of formula I:

$$R^1O(R^2O)_a(X)_b \qquad (I)$$

wherein, $R^1$ is $C_{6-30}$ alkyl group, preferably a $C_{6-12}$ alkyl group, e.g. a $C_{9-11}$ alkyl group, $R^2$ is an alkylene group having from 2 to 4 carbon atoms (e.g. $-CH_2CH_2-$, $-CH_2CH_2CH_2-$ or $-CH_2CH_2CH_2CH_2-$), X is a saccharide residue having 5 or 6 carbon atoms, a is an integer having a value of 0 to 12, and b is an integer having a value of 1 to 6, and mixtures thereof. Mixtures of alkyl polyglycosides of formula I are particularly preferred.

In preferred alkyl polyglycosides of formula (I), X is a glucose residue. In further preferred alkyl glycosides, a is 0. In still further preferred alkyl glycosides, b is 1 to 2.

Examples of alkyl polyglycosides of formula (I) are those sold under the tradenames GLUCOPON and APG. These surfactants are commercially available from Halliburton Energy Services. Specific examples of such surfactants include GLUCOPON 225DK, GLUCOPON 425N, GLUCOPON 625UP, GLUCOPON 600UP, GLUCOPON 220N and APG 325.

APG325 is a particularly preferred foaming agent for use in the methods of the present invention. This surfactant is an alkyl glycoside in which the alkyl group contains 9-11 carbon atoms and the average degree of polymerization (i.e. b in formula I) is 1.4-1.6.

Preferably the foaming agent used in the present invention is non-ionic. Preferably the foaming agent is not ionic.

The foaming agent is typically present in an amount of 0.01 to 10% by volume of the solution that is foamed, preferably in an amount of 0.1 to 5%, still more preferably 1 to 3%, e.g. 1.5 to 2.5% volume.

The scale treatment agents (e.g. scale inhibitor and/or scale dissolver) used to make a foam of the invention are preferably in the form of an aqueous solution or dispersion, preferably as an aqueous solution. The water used to form the aqueous solution or dispersion may be any aqueous fluid that does not adversely react with, for example, the scale inhibitor or scale dissolver. For example, the water may be fresh water, brine, water solutions containing salt, such as sodium chloride solutions, potassium chloride solutions, ammonium chloride solutions, sea water and brackish water. Water solutions containing salts are particularly preferred, especially brine.

The method of the invention may employ any conventional scale inhibitor. As used herein, the term "scale inhibitor" means any substance that inhibits or prevents the deposition of scale within a hydrocarbon producing system. Scale inhibitors are well known to those skilled in the art and include, for example, phosphonates, phosphate esters and polymers comprising phosphonate, sulfate and carboxylate groups. Representative examples of specific scale inhibitors that may be used in the method of the present invention include hexamethylene diamine tetrakis (methylene phosphonic acid), poly (aspartic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxy ethylidene 1,1-diphosphonate (HEDP phosphonate), bisaminoethylether phosphonate (BAEE phosphonate) and 2-acrylamido-2-methyl-1-propanesulphonic acid (AMPS).

Preferably, the scale inhibitor for use in the method of the invention comprises at least one anionic group, e.g. a carboxylate group. By a carboxylate group is meant a group —COO$^-$Z$^+$ wherein Z is a counter ion, preferably hydrogen or a metal atom (e.g. a group I or II metal atom).

Particularly preferred scale inhibitors for use in the invention are polymeric. Polymeric scale inhibitors may be made by any conventional polymerization method or may be commercially available, e.g. from Champion Technologies Ltd. Still more preferably the scale inhibitors for use in the invention are polymeric and comprise at least one anionic group.

The scale inhibitor is preferably a polymer formed from an anionic monomer. By an "anionic monomer" is meant a monomer carrying a group capable of providing a negative charge on the resulting polymer chain. Preferred anionic monomers carry at least one carboxylate group.

Polymeric scale inhibitors for use in the present invention are preferably formed from monomers of formula (II):

(IIa)

(IIb)

wherein
$R^3$ is —CO$_2$Z, —SO$_3$Z, —PO$_3$Z$_2$ or an alkyl or aryl group (e.g. a C$_{1-10}$ alkyl or aryl group) substituted with at least one (e.g. one) —CO$_2$Z, —SO$_3$Z or —PO$_3$Z$_2$ group in which Z is a hydrogen atom or a univalent metal atom;
$R^4$, $R^5$ and $R^6$ are each independently hydrogen, an optionally substituted alkyl or aryl group having from 1 to 6 carbon atoms or a group $R^3$ as hereinbefore defined.

In preferred monomers of formula (II), $R^3$ is —CO$_2$Z, an alkyl group (e.g. C$_{1-3}$ alkyl) substituted with at least one (e.g. one) —CO$_2$Z group or an aryl group (e.g. a phenyl group) substituted with at least one (e.g. one) —CO$_2$Z group. In particularly preferred monomers, $R^3$ is —CO$_2$Z. In further preferred monomers of formula (II), the group Z is hydrogen or a group I or II metal atom (e.g. sodium or potassium).

Preferred monomers of formula (II) are also those wherein $R^4$ is a hydrogen atom or a substituted or unsubstituted, preferably unsubstituted, alkyl group. Particularly preferably $R^4$ is hydrogen or a C$_{1-3}$ alkyl group (e.g. methyl). Still more preferably R is hydrogen.

In further preferred monomers of formula (II), $R^5$ and $R^6$ are independently hydrogen, —CO$_2$Z, an alkyl group (e.g. C$_{1-3}$ alkyl) substituted with at least one (e.g. one) —CO$_2$Z group or an aryl group (e.g. a phenyl group) substituted with a —CO$_2$Z group wherein Z is as hereinbefore defined. Although $R^5$ and $R^6$ may be different, in preferred monomers of formula (II), $R^5$ and $R^6$ will be the same. Still more preferably $R^5$ and $R^6$ are both hydrogen atoms.

Preferred monomers are those of formula (IIa).

Particularly preferred scale inhibitors for use in the present invention are polymers comprising an anionic monomer selected from acrylic acid, methacrylic acid, vinyl sulfonic acid, vinyl phosphonic acid, maleic anhydride, itaconic acid, crotonic acid, maleic acid, fumaric acid or styrene sulfonic acid. Especially preferred scale inhibitors are formed from anionic monomers selected from acrylic acid, methacrylic acid, maleic anhydride, itaconic acid, crotonic acid and maleic acid, especially acrylic acid. Such monomers are commercially available, e.g. from Aldrich Chemical Company Inc.

Especially preferred scale inhibitors for use in the present invention comprise a copolymer formed from a diallyl ammonium salt (e.g. diallyl dimethyl ammonium chloride) and at least one anionic monomer as hereinbefore described. Representative examples of scale inhibitors of this type are disclosed in WO2007/01509 to Champion Technologies Ltd and WO2007/08041 to Champion Technologies Ltd and Sichuan Sanyuan Chem Limited, Corporation.

Particularly preferred scale inhibitors for use in the present invention have one or more inorganic end groups (e.g. one or more phosphonate end groups). By an "end group" is meant a non-monomeric group which is located at an end of the polymer chain and/or on a side group (e.g. —COOH) of the polymer chain and is covalently attached to the monomer adjacent thereto. Representative examples of preferred inorganic end groups include —SO$_4$H, —SO$_3$H, —H$_2$PO$_3$, —H$_2$PO$_4$ and salts thereof. Further preferred end groups include anionic derivatives of the aforementioned groups (e.g. —SO$_4^-$, —SO$_3^-$ —HPO$_3^-$ and —HPO$_4^-$).

These end groups may be incorporated into the polymer during polymerization from a chain transfer agent and/or initiator or by inclusion of a specific compound at the start of polymerization. Especially preferred end groups are those which contain phosphorus. These facilitate measurement of the concentration of polymer in the production waters (e.g. by ICP). Phosphorus containing end groups may be introduced by using hypophosphorus acid or salts thereof as a chain transfer agent during polymerization and/or by using a species such as vinylidene diphosphonic acid (VDPA) as a starting block from which the polymer is grown.

Representative examples of commercially available scale inhibitors that are suitable for use in the method of the invention include GYPTRON SA1530, GYPTRON SA3050, GYPTRON SA3070, GYPTRON SA1820, GYPTRON SA1400, GYPTRON SA1470, GYPTRON SA1110, GYPTRON SA1460 and GYPTRON SA1910 (all available from Champion Technologies Ltd). GYPTRON SA1910 is especially preferred.

The method of the invention may employ any conventional scale dissolver. As used herein, the term "scale dissolver" means any substance that dissolves scale present within a hydrocarbon producing system. Scale dissolvers are well known to those skilled in the art and include, for example, alkaline solutions such as a solutions of potassium carbonate and potassium hydroxide, a solution of a salt of ethylenediaminetetracetic acid (EDTA) or diethylenetriaminepentacetic acid (DTPA).

Preferred scale dissolvers for use in the present invention are polycarboxylic acids or salts thereof, preferably aminopolycarboxylic acids or salts thereof. Representative examples of scale dissolvers that may be used in the method of the invention include those sold under the tradename NOXOL by EuroCorpex (e.g. NOXOL 100, NOXOL 771, NOXOL 678 and NOXOL 550). Particularly preferably the scale dissolver used in the method of the invention is NOXOL 771 or SD250. The latter is commercially available from Champion Technologies Ltd. and comprises potassium carbonate and ester of an aliphatic carbonic acid.

Commercially available scale dissolvers may additionally comprise a foaming agent. Preferred scale dissolver formulations therefore comprise a foaming agent as hereinbefore described. If such a formulation is used, further foaming agent may not be required.

The foams used in the present invention thus preferably comprise a scale treatment agent (e.g. a scale inhibitor and/or scale dissolver), a foaming agent, a gas and water. Preferably the foam does not comprise amine. Preferably the foam also does not comprise fibers.

The foam may be formed by any conventional technique. Thus an aqueous solution or dispersion (e.g. solution) comprising scale treatment agent (e.g. scale inhibitor and/or scale dissolver) may be prepared. The solution or dispersion is then introduced into the formation along with foaming agent and gas so that a foam is formed therein.

Alternatively an aqueous solution or dispersion (e.g. solution) comprising foaming agent and scale treatment agent (e.g. scale inhibitor and/or scale dissolver) may be prepared. The solution or dispersion is then introduced into the formation along with gas so that a foam is formed therein. An aqueous solution or dispersion for the preparation of a foam (e.g. a squeeze treatment foam) comprising a scale treatment agent, a foaming agent and water thus forms a further aspect of the invention.

The foams of the present invention are preferably sufficiently stable to remain in the form of foams during their introduction into the formation as this facilitates diversion. At the same time, however, the foams should also be sufficiently unstable that after delivery (e.g. by diversion) it collapses or separates into liquid. This liquid comprises the scale treatment agent which can dissolve and/or inhibit scale. The provision of foams having appropriate stability is therefore an important feature of the present invention. Preferred foams exist in the form of foams during delivery. Particularly preferred foams form liquid after placement in the formation. Especially preferred foams form liquid within 1-15 minutes of being placed in the formation, more preferably within 2-10 minutes of being placed in the formation, e.g. within 3-8 minutes of being placed in the formation.

Particularly preferred foams of the present invention have static half lives (e.g. as measured according to the technique specified in the examples described herein) of 1 to 30 minutes, more preferably 2 to 20 minutes, e.g. 3 to 15 minutes. Further preferred foams of the present invention create a pressure gradient of 10 to 40 bar/m (e.g. as measured according to the technique described in the examples herein), more preferably 15 to 30 bar/m, e.g. 20 to 15 bar/m.

The foam may be formed by any conventional foam generator. The generator may be located within the well, but more preferably is located outside the well. In either case, the foam generator preferably forms foam prior to its delivery into the formation to be treated.

By using a foam to deliver scale treatment agent (e.g. scale inhibitor and/or scale dissolver) it is possible to divert the treatment agent to low permeability and high pressure zones within the formation (i.e. zones that may not be reached by conventional squeeze treatments). This is partly because a much smaller volume of liquid needs to be injected into the formation in order to fill or block off those zones of high permeability or low pressure as the volume of liquid injected is magnified by generation of the foam (e.g. a foam having a gas fraction of 50% occupies double the volume of the liquid from which it is formed). As a result it becomes feasible to inject sufficient liquid to form foams that reach those zones of the formation that cannot be treated by liquid squeezes.

A further advantage that arises from the fact that a much smaller volume, and therefore weight, of fluid is introduced to the formation than in conventional squeeze treatment is that it is relatively simple to remove at the end of treatment. In most cases the reservoir pressure will be sufficient to expel the scale treatment agent from the formation.

The concentration of scale inhibitor in the solution used to form foam is preferably an amount effective to inhibit scale formation and will be readily determined by those skilled in the art. Typically, however, the scale inhibitor will be present in the solution used to form foam at a concentration of 0.05 to 50% wt, preferably 0.1 to 30% wt, more preferably 1 to 20% wt, e.g. about 5 to 10% wt. In a preferred method of the invention, the scale inhibitor return curve produced by the foamed scale inhibitor is comparable to the return curve for the corresponding liquid treatment.

The concentration of scale dissolver in the solution used to form foam is preferably an amount effective to remove scale and will be readily determined by those skilled in the art. Typically, however, the scale dissolver will be present in the solution used to form foam at a concentration of 30 to 100% wt, preferably 50 to 100% wt, more preferably 80 to 100% wt, e.g. about 90 to 100% wt prior to foaming.

In preferred methods of the invention the performance of the scale treatment agent is unaffected by its delivery in the form of a foam. It some cases, however, the performance of the scale treatment agent (e.g. scale dissolver) may be slightly diminished compared to its performance in a treatment liquid. This disadvantage is, however, far outweighed by the fact that by providing the scale treatment agent in the form of a foam, areas of the formation that cannot be treated with liquid squeezes can be reached.

The foam may also contain other additives known in the art for use in well treatment. Such additives include thickeners, diversion agents, viscosity enhancers (e.g. polymers), corrosion inhibitors, pH buffers and catalysts. Preferably, however, the foam consists essentially of (e.g. consists of) a scale treatment agent, a gas, a foaming agent and water as hereinbefore described.

The nature and amount of foam to be used to inhibit or remove scale will vary widely depending on factors such as the nature of the inhibitor or dissolver used, the nature of the formation (e.g. the levels of Ba, Sr and Ca present), the reservoir pressure and temperature and so on. Generally foam stability is increased by increased reservoir pressure and decreased by increased reservoir temperature. The skilled person will readily be able to identify an appropriate foam for any given reservoir conditions.

The appropriate amount of scale inhibitor or dissolver will also be readily determined by those skilled in the art. Typically, however, 50-1000 $m^3$ of liquid is used to generate foam for a single treatment, more preferably 100-500 $m^3$.

The treatment method of the present invention may be applied to a hydrocarbon producing system at any stage, e.g. before and/or after hydrocarbon production. Treatment according to the invention may also be repeated as many times as necessary. The treatment method of the present invention is particularly useful in horizontal intervals.

Treatment according to the method of the present invention may be conducted according to any techniques conventional in the art and any convenient equipment may be used to supply the foam to the hydrocarbon producing system. For instance, bull heading or coil tubing may be used. Thus the foam may be introduced into a well bore by, for example, injection under pressures sufficient to penetrate the formation and the equipment present therein. A preferred method for introducing the foam hereinbefore described is bull heading.

Although the method of the invention may be carried out on a hydrocarbon producing system (e.g. a subterranean formation) without any pre-flush, it is preferred to treat the formation with a pre-flush composition prior to treatment with the foam described herein. The purpose of the pre-flush may be, for example, to wet the surface of the formation (e.g. if the formation is oil-rich) to aid retention of the scale inhibitor or scale dissolver described herein.

Preferably the pre-flush composition is provided in the form of a foam. Thus the pre-flush composition preferably comprises a pre-flush agent, a foaming agent (e.g. as hereinbefore described), a gas and water. Examples of pre-flush agent include surfactants, a mutual solvent (e.g. ethylene glycol monobutyl ether) and bridging agents. Particularly preferred bridging agents are disclosed in pending UK Patent Application no. 0624964.3 (e.g. GYPTRON SA1360 and GYPTRON SA1810 which are commercially available from Champion Technologies Ltd).

An after-flush or over-flush may also be optionally used in the method of the invention. Preferably the after-flush is provided in the form of a foam. Thus the after-flush composition preferably comprises an after-flush agent (e.g. inorganic salts, stabilising agent etc), a foaming agent (e.g. as hereinbefore described), a gas and water. An after-flush is typically done following addition of the foam described herein. It serves to displace any agents which has not absorbed onto the surface of the formation out of the well bore.

Treatment shut in period will depend on a number of factors including the nature of the foam used, the nature of the formation and the level of scaling which would otherwise occur and/or is present therein. Typical shut in times may be readily determined by those skilled in the art and will generally be in the range from 0.5 to 24 hours, preferably 1 to 16 hours, e.g. about 8 to 12 hours.

BRIEF DESCRIPTION OF THE DRAWINGS

The invention will now be further described by way of the following non-limiting Examples and Figures wherein.

EXAMPLES

Compatibility Test

The objective of this test was to establish whether the use of the foaming agent, APG 325 in the scale treatment agent of the present invention effects oil and water separation since separation must be carried out on produced fluids.

Heidrun formation water and oil samples were mixed and heated up to 45° C. This is to simulate the separator working conditions. A scale treatment agent as shown in the Table below was then added and the mixture was shaken 100 times. The final mixture was placed in a water bath and observed for separation and emulsion formation.

| Formation water (ml) | Oil (ml) | NaCl brine (ml) | SA1470 (ml) | SA1360 (ml) | APG 235 (ml) | Observations |
|---|---|---|---|---|---|---|
| 100 | 100 | 88 | 10 |  | 0.3 | Good separation |
| 100 | 100 | 88 |  | 10 | 0.3 | Good separation |

The results show that the foaming agent used in the scale treatment agent of the present invention does not effect oil and water separation.

Foam Stability

The objective of this test was to establish if a foam comprising a scale treatment chemical and having appropriate stability could be formed. Ideally the foam is sufficiently stable that it remains in foam form throughout its delivery into the well so that it can be easily diverted. At the same time, however, the ideal foam should collapse once delivered to the target site so that the well treatment chemicals are provided in solution and can provide treatment.

Chemicals

Foaming agents: ESTISURF GS-60 (liquid), 60% commercially available from Kraft chemicals, Norway and APG® 235 CS (liquid), 50% commercially available from Henkel.

Scale treatment chemicals: GYPTRON 1360 and GYPTRON 1470, which are both commercially available from Champion Technologies Ltd. 4.5% wt NaCl solution.

The concentration of scale treatment chemical in the treatment solution subsequently foamed was 10% by volume.

Foam Stability Test

A volume of about 70 ml of the proposed treatment solution containing a specific amount of a foaming agent was added to a 300 ml volume visual see-through cell (theoretical foam quality=77%). The cell was closed in and heated to the test temperature of 85° C. The test pressure (200 psi) was applied with nitrogen. A uniform foam was generated in situ by rotation of the multilevel paddle at 2000 rpm for 1 minute. The amount of free liquid separating from the foam was determined at fixed time intervals. The half-life of the foam is taken as the time it took for 35 ml (i.e. half of the fixed sample volume) of liquid to separate from the foam. The foam quality is the volume ratio of the gas phase at 85° C. and 200 psi based on the actual volume of treatment solution measured.

At least two trials were performed for each fluid/treatment solution listed in table 1 below. Half lives are measured in minutes.

TABLE 1

| Fluid | Foamer | Concentration % vol | Data | Total |
|---|---|---|---|---|
| 10% 1360 in 4.5% NaCl | ESTISURF GS60 | 0.25 | Average of Half Life | 3.56 |
| | | | Average of Quality | 75 |
| | APG 325CS | 0.1 | Average of Half Life | 1.02 |
| | | | Average of Quality | 73.8 |
| | | 0.15 | Average of Half Life | 4.79 |
| | | | Average of Quality | 78.2 |
| 10% 1470 in 4.5% NaCl | ESTISURF GS60 | 0.25 | Average of Half Life | 2.46 |
| | | | Average of Quality | 79.6 |
| | | 0.3 | Average of Half Life | 5.34 |
| | | | Average of Quality | 81.5 |
| | | 0.5 | Average of Half Life | 8.38 |
| | | | Average of Quality | 83 |
| | | 0.35 | Average of Half Life | 6.65 |
| | | | Average of Quality | 78.5 |
| | APG 325CS | 0.1 | Average of Half Life | 1.51 |
| | | | Average of Quality | 73 |
| | | 0.15 | Average of Half Life | 5.61 |
| | | | Average of Quality | 79.2 |

The results show that foams containing scale treatment chemical can be formed that have a half life of up to 8 minutes at a temperature of 85° C. and a pressure of 200 psi. APG 325 CS was generally found to provide more stable foams than ESTISURF GS60. As a result, useful foams for the delivery of scale treatment chemicals could be formed with low concentrations of APG 325 CS.

The minimum concentration of foaming agent necessary to provide a foam having a half life of at least 3 minutes was also determined for each foaming agent/treatment solution combination. The results are shown in Tables 2a and 2b below.

TABLE 2a

GYPTRON SA1360 Scale Inhibitor:

| Foamer | Min. Concentration | Avg Half life | Avg Quality |
|---|---|---|---|
| ESTISURF GS60 | 0.25% by vol | 3.5 minutes | 75 |
| APG 325CS | 0.15% by vol | 4.8 minutes | 78 |

TABLE 2b

GYPTRON SA1470 Scale Inhibitor:

| Foamer | Min. Concentration | Avg Half life | Avg Quality |
|---|---|---|---|
| ESTISURF GS60 | 0.3% by vol | 5.3 minutes | 81.5 |
| APG 325CS | 0.15% by vol | 5.6 minutes | 79 |

The results show that low concentrations (<1% vol based on treatment solution) of foaming agent yield foams containing scale treatment chemical having a half-life of at least 3 minutes. Such foams are ideal for the delivering scale treatment chemicals as they are stable enough to be delivered in the form of a foam, but will collapse to form effective treatment solutions shortly thereafter.

Use of a Foam During Placement of Scale Inhibitor

The objectives of these experiments were to test if: (i) the foam can be formed during injection (by pressure monitoring); (ii) the foam can be injected; and (iii) the foam is compatible with a core plug (i.e. there is no formation damage as a result of injection of the foamed scale inhibitor fluid).

Core Material and Fluids

Fluids

Heidrun reservoir brine was made according to a composition as described in Table 3 below. The recipe was used to make five liter brine. After preparation, the brine was filtered through a 0.45 μm membrane filter and the pH was adjusted to 6.5.

TABLE 3

| Constituent | mass (g) |
|---|---|
| NaCl | 247.98 |
| KCl | 5.20 |

TABLE 3-continued

| Constituent | mass (g) |
|---|---|
| $CaCl_2 \cdot 2H_2O$ | 18.71 |
| $MgCl_2 \cdot 6H_2O$ | 11.08 |
| $BaCl_2 \cdot 2H_2O$ | 2.53 |
| $SrCl_2 \cdot 6H_2O$ | 2.21 |

An aqueous solution of scale inhibitor and surfactant was based on 60 g/l NaCl brine. 10 ml of the scale inhibitor GYPTRON SA1910 was added to 100 ml of this brine. The surfactant solution was made by adding 2 ml of the APG 325N surfactant concentrate available from Halliburton to 100 ml of the mixture of brine and scale inhibitor. The APG 325N surfactant concentrate contains 30-50% of a $C_{9-10}$ alkyl polyglycoside. The mixture of NaCl brine, scale inhibitor and surfactant was filtered through a 0.45 μm membrane filter. The surfactant concentration of the mixture was less than 1% active matter.

The oil used in the experiments was a Heidrun stock tank oil (STO).

Core Material

The composite core was made of two sandstone plugs from the Heidrun well taken at depths 3010.82 and 3010.91 m MD (measured depth) respectively. The core plugs were poorly consolidated and were kept frozen. Each plug was trimmed at the ends till a total of 110 mm each. The total length of the composite was 220 mm.

Flooding Apparatus

Figure 1:
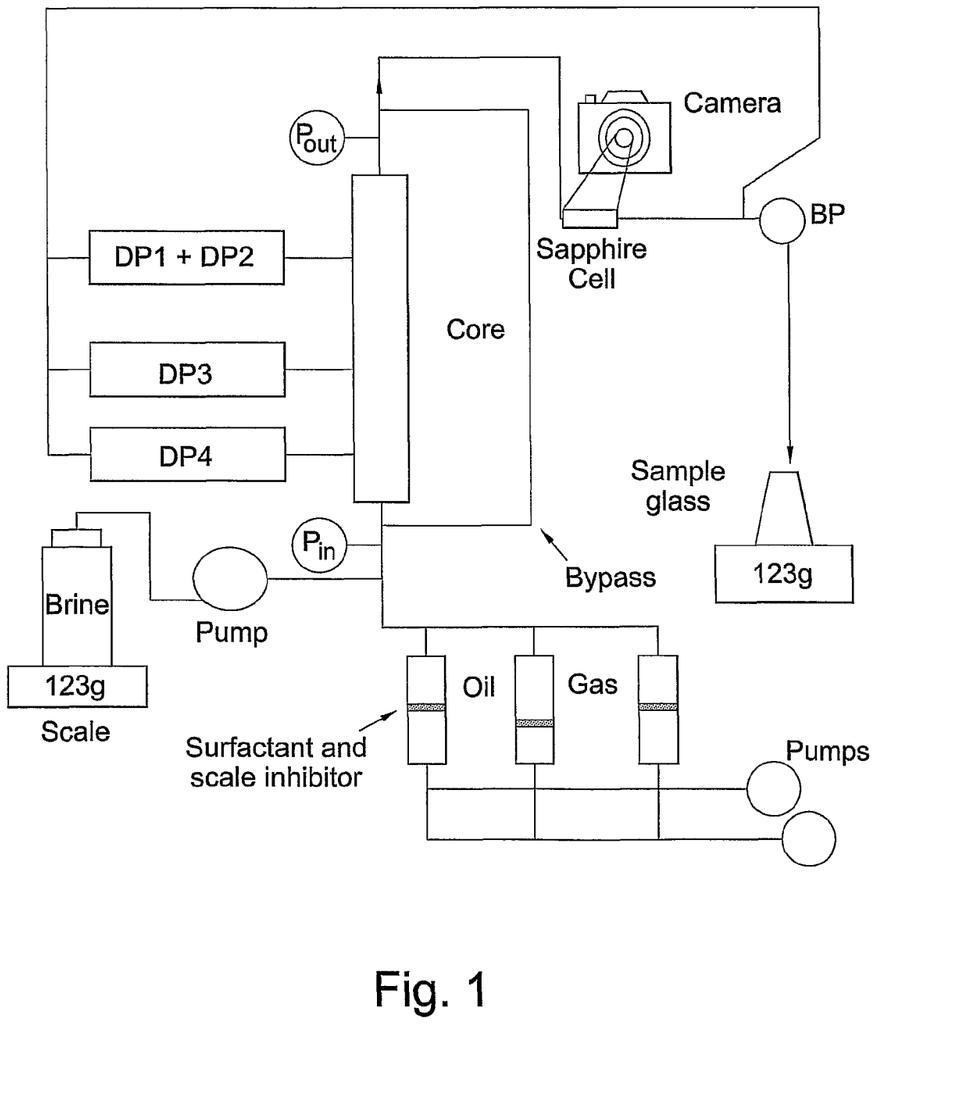
FIG. 1 is a schematic of the core flooding apparatus used to test whether a foam comprising scale inhibitor can be formed.

The foam test was performed in a core holder having multi-port connections of differential pressure transducers through one of the end caps. Three pressure connections along the core were used. A schematic sketch of the flooding apparatus is shown in FIG. 1.

Aqueous solution of surfactant and scale inhibitor was stored in a pressure bottle with piston. Oil and nitrogen gas were stored in separate pressure bottles with piston and the fluids were injected by pumping of kerosene into the hydraulic sides of the bottles. The three piston bottles were stored outside the heating cabinet during the experiments.

During the various phases of the experiments the core effluent was produced through a back pressure valve placed outside the heating cabinet and collected in suitable containers. The line from the heating cabinet and the process side of the back pressure valve was heated by use of heating cables.

The differential pressure over the core was determined by use of four pressure transducers connected at three ports along the core and outlet of the core. DP1 and DP2 were connected at 7 cm (in parallel), DP3 at 12 at cm and DP4 at 17 cm from outlet at the end of the core.

The measuring rage of DP1 was 660 mbar, the range of DP2 was 5 bar and the ranges of DP3 and DP4 were both 20 bar. Line pressure transducers were connected to the flow lines both before and after the core.

Mounting of Composite Core

1) The frozen core plugs were kept frozen during mounting using dry ice as coolant.
2) A diffusion barrier was wrapped around the composite core, equipped with holes for the differential pressure ports. Holes were equipped with metal gauzes.
3) The composite core was fitted inside a rubber sleeve with pressure ports
4) 50 bar sleeve pressure was first applied using nitrogen as pressure medium.
5) The core holder was left overnight for leakage testing both on process side and on the confining pressure side.
6) Nitrogen was replaced by hydraulic oil at close to constant confining pressure.
7) The core holder was mounted into the flooding rig.
8) Dead volumes upstream and downstream of the core was determined.
9) The pore volume (PV) of the composite core was estimated based on core dimensions and expected porosity.

Cleaning and Initial Preparation Measurements

1) The core was subjected to mild cleaning at room temperature by first injecting 20-50 PV formation water until the effluent was clean and the differential pressures were constant. Injection rate was initially low (1 ml/min) and never exceeded 10 ml/min. The effluent was collected and inspected for fines. Then 20-50 PV kerosene/lamp oil was injected until the effluent was clean and the differential pressure was constant. The effluent was collected and inspected for fines.
2) The process pressure was increased to 250 bar during the last stage of the cleaning process. The net confining pressure was adjusted to 300 bar.
3) When the core was clean the temperature was increased to 85° C.
4) The oil permeability was determined at 85° C. by a four point measurement, starting with the highest flow rate. The kerosene was substituted by n-decane during the permeability measurements.
5) Stock tank oil and Heidrun brine were co-injected at a volumetric ratio 3:2 at an injection rate of 2.50 ml/min until a constant differential pressure across the core was obtained.

Experimental

During all the experiments an overburden pressure of approximately 50 bar was used. Both measurements of basic core parameters and the foam experiment were performed at a temperature of 85° C. and with a line pressure at the core exit of 250 bar.

Determination of Basic Core Parameters

Before the foam injection, permeability at initial water saturation was determined by injection of n-decane at variable rates and the corresponding differential pressures across the core was measured. The differential pressures were corrected for pressure loss in the flow lines by bypassing of the core. The calculated permeabilities are given in Table 4.

TABLE 4

| Flow rate (ml/min) | dp (mbar) | Permeability (Darcy) |
|---|---|---|
| 8.32 | 82.86 | 1.375 |
| 6.29 | 62.10 | 1.388 |
| 4.25 | 41.88 | 1.389 |
| 2.19 | 21.43 | 1.398 |
| Average | | 1.39 |

Figure 2:
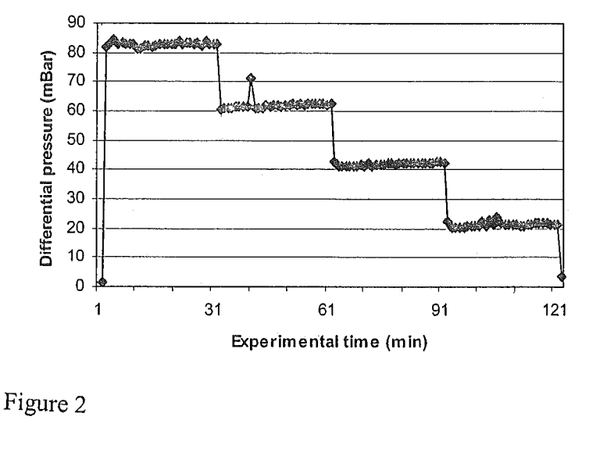
FIG. 2 shows the differential pressure in a core with different amounts of n-decane pumped therethrough prior to foam flooding.
Figure 3:
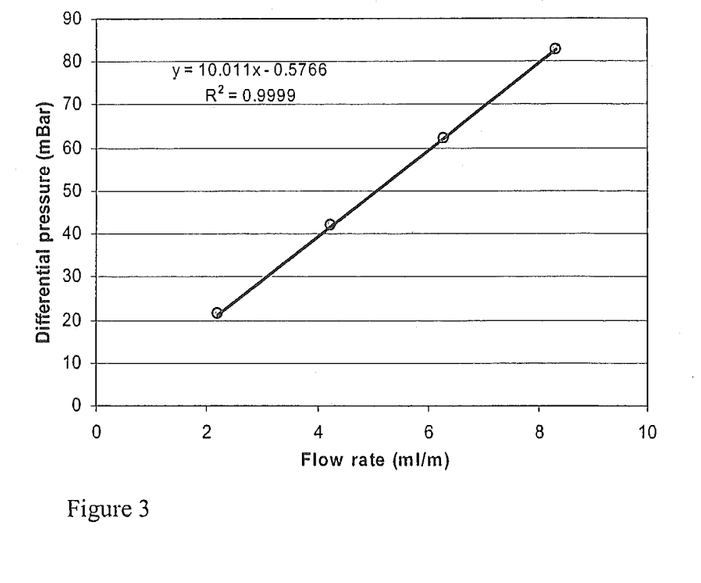
FIG. 3 shows the differential pressure versus flow rate of n-decane to determine core permeability.

After the foam test the core was cleaned by flooding with kerosene until no more brine was produced. The kerosene was then exchanged with n-decane and the permeability was measured. The differential pressure in the core with different amounts of n-decane pumped therethrough prior to foam flooding is shown in FIG. 2. For each set flow rate, the change in mass in the brine reservoir and the logged differential pressures were used to determine the average flow rate and the average differential pressure respectively. The slope of the curve shown in FIG. 3 was used for calculation of the permeability.

After the permeability measurement the core was cleaned and evacuated by use of a vacuum pump. Heidrun brine was then injected into the core and the pore volume was determined from the mass (and thus volume) of injected brine, corrected for dead volumes in the evacuated part of the apparatus.

Basic parameters for the Heidrun core used in the experiment are given in Table 5.

Foam Injection Experiments

1) Foam was injected from the bottom of the vertically oriented core.

2) The foam quality (gas fraction) was 75% in the first part of the injection and decreased to 50% in the last part. Approximately 25 PV of foam was injected.

3) After foam injection the core was closed. The response in differential pressures was determined after injection stop.

4) The core was left shut in overnight.

Back Flushing 1) 376 PV of formation brine was injected at a flow rate of 1 ml/min from the bottom of the core.

2) The brine was pumped through the injection pump (a piston bottle was not used at this stage).

3) The differential pressure across the core was determined.

4) For the first 3 PV samples of the effluent was collected in 5 ml fractions.

5) For the next 100 PV the effluent was collected in fractions of 50 ml. For each 50 ml fraction a 5 ml aliquot was transferred to a suitable sample vial.

6) For the rest of the back flushing two fluid samples was collected per day.

Final Measurements

1) The core was flooded with several pore volumes of kerosene until a constant differential pressure was obtained.

2) The kerosene was replaced by n-decane and the permeability was measured

3) The core was then cleaned by injection of several slugs of toluene and methanol.

4) The core was then evacuated and finally the pore volume was determined by injection of brine into the evacuated core Results and Discussion

TABLE 5

| Parameter | quantity |
|---|---|
| Core length (cm) | 22.0 |
| Core diameter (mm) | 38.0 |
| Pore volume (ml) | 72.6 |
| Porosity (%) | 28.4 |
| Oil permeability at Swi before foam flooding (Darcy) | 1.39 |
| Oil permeability at Swi after foam test and back flushing (Darcy) | 1.01 |

When the permeability at the start of the experiment (1.39 Darcy) and after the foam flooding (1.01 Darcy) are compared, it is seen that the permeability has only slightly decreased. This indicates that the core is essentially undamaged by the treatment.

Foam Injection Tests

Heidrun brine and stock tank oil were co-injected into the vertical core until a stable differential pressure was obtained. The total injected rate was 2.50 ml/min (at reservoir conditions) and the oil fraction was 60%.

After this injection aqueous solution with scale inhibitor and surfactant was co-injected into the core at a total rate of 5.0 ml/min and with a gas fraction of 75%. The differential pressure history of the foam experiment is displayed in FIG. 4.

The experiment started with the core closed and the system in bypass. From FIG. 4 it is seen that the differential pressure measured over the bypass line was constant in the period. After 8 PV injected in bypass the valves were opened to the core.

Figure 4:
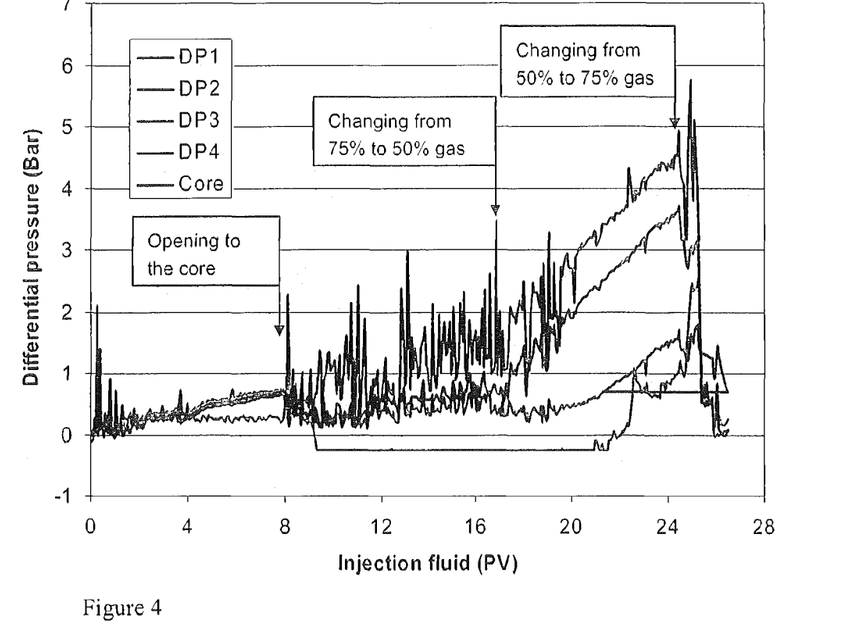
FIG. 4 shows the differential pressure history of core following injection of foam comprising scale inhibitor.

In the first 9 PV foam injected into the core (from 8 PV to 17 PV) the gas fraction was 75%, and the pressure had a slow build up to almost two bars. Then the gas fraction was reduced till 50%, but the total injection rate was kept constant at 5.0 ml/min. The pressure started to increase more rapidly with 50% gas fraction, and after 24 PV the differential pressure across the core was close to 5 bars.

After 24 PV, the gas fraction was changed back to 75% in order to see the effect of the foam quality. This resulted in an almost instant drop in pressure of about 2 bars, but the differential pressure quickly increased again. From DP1 and DP2 it is seen that the pressure became higher than for 50% gas fraction. The gas bottle was empty after 25 PV injected. The pressure dropped immediately after injection stopped. This indicates that a foam of an appropriate strength was formed, i.e. a foam that collapses to liquid once delivered to the target site.

The average differential pressures obtained in the four phases of the experiment are summarized in Table 6.

TABLE 6

| Period (PV) | Gas fraction (%) | Max dp (bar) |
|---|---|---|
| 0-8 | 0 | 0 |
| 9-17 | 75 | 2+ |
| 17-24 | 50 | 4.7 |
| 24-25 | 75 | 5+ |

For 2% surfactant concentrate, the differential pressure of 5 bar across a 22 cm long core corresponds to an average pressure gradient of 23 bar/m. This indicates that a weak foam was formed.

Back Flooding

Figure 5:
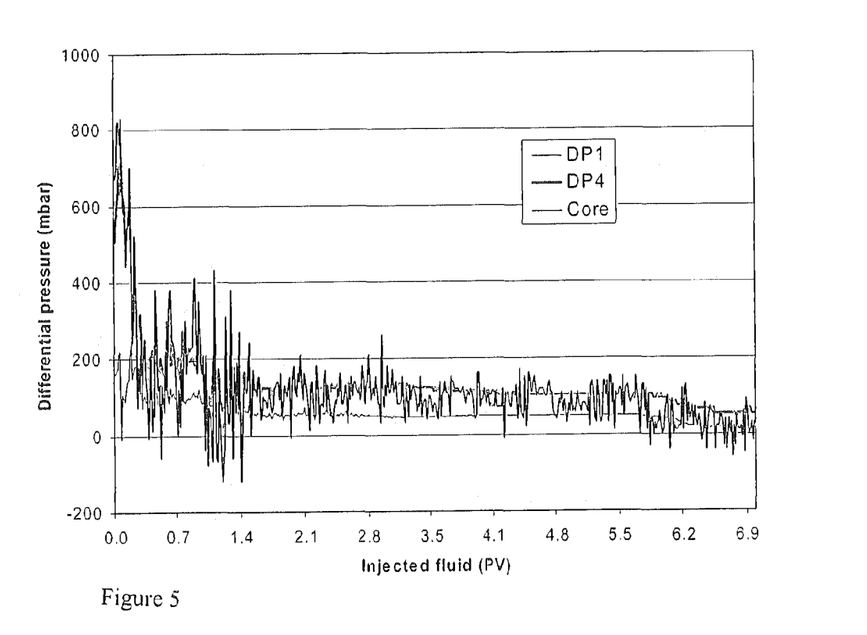
FIG. 5 shows the change in differential pressure in a core containing foam during back flooding.

The next day after the foam tests formation water was injected into the core at 1.0 ml/min. The differential pressure recording during the first part of this step is shown in FIG. 5. As seen from the figure the differential pressure decreased during the flood as more and more gas was produced from the core. Around six PV injected the differential pressures made a drop to a lower level which were kept for the rest of the back flushing.

Figure 6:
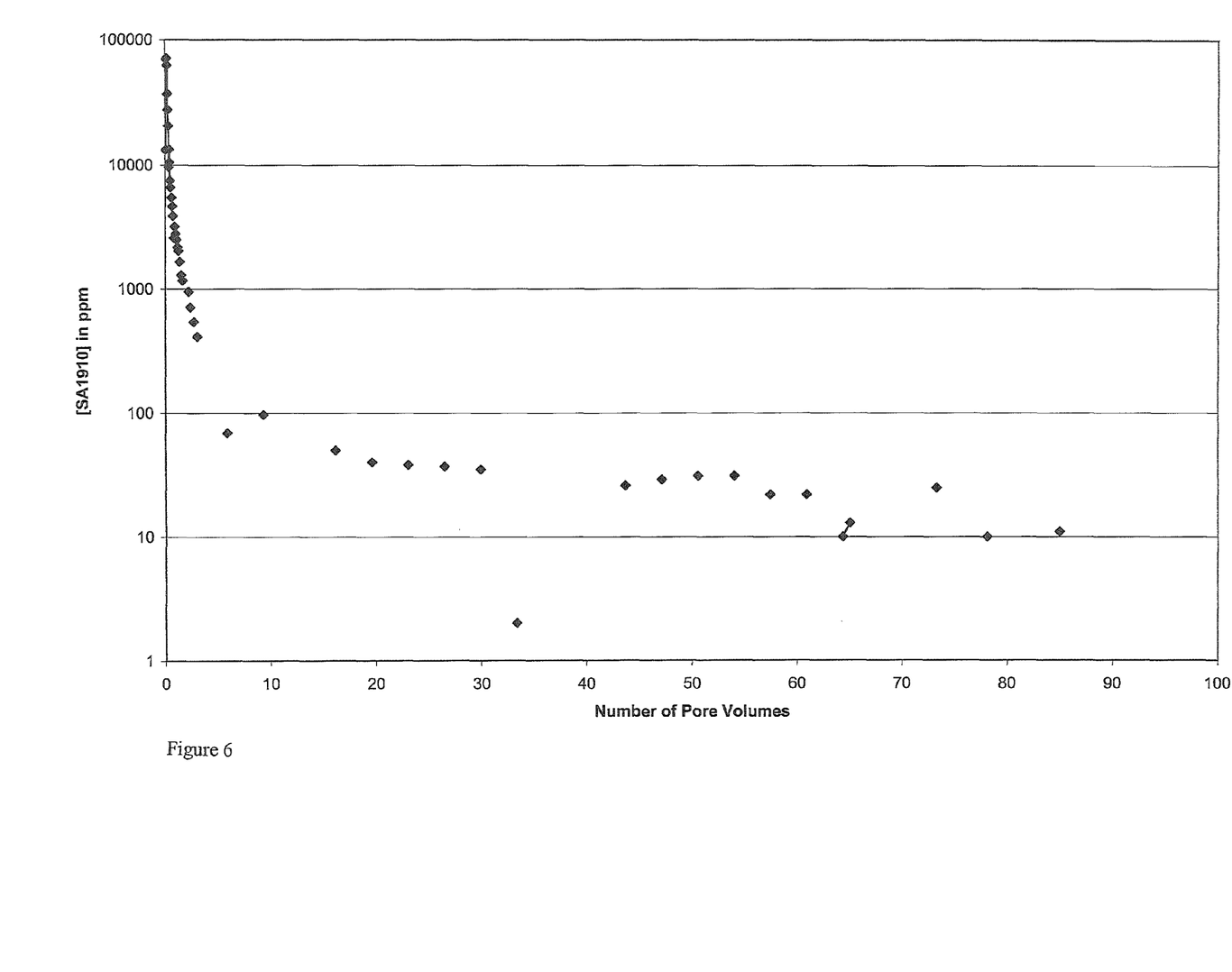
FIG. 6 shows the return curve for foamed GYPTRON SA1910 scale inhibitor.

During the back flushing the produced liquid was collected for later analysis of the content of scale inhibitor. In the beginning of the back flushing the samples were collected continuously in 5 ml tubes. Some of the early tubes were only partly (to approximately 3 ml) filled due to foam and unstable gas production that resulted in some liquid loss from the tubes. After 3 PV brine were injected 5 ml samples were collected for every 50 ml brine injected, and after 77 PV 5 ml sample was taken every 12 hours of brine injection. When the back flushing was stopped 376 PV of brine had been flooded through the core. The return curve is shown in FIG. 6. It is comparable to the return curve of a conventional liquid squeeze treatment.

Conclusions

The surfactant system APG 325N has been tested for the ability to form foam during injection with the scale inhibitor, GYPTRON SA1910, into a vertically oriented Heidrun core saturated with Heidrun stock tank oil and brine at Heidrun reservoir temperature and pressure. The gas phase was nitrogen, and the gas fraction in the injected mixture was 75% and 50%.

With a concentration of 2% surfactant, a differential pressure in excess of 5 bar was determined over the 22 cm long core for foam injection into the bottom of the core. This corresponds to a pressure gradient of more than 23 bar/m which indicates that foam formed during injection. When injection stopped, the differential pressure immediately dropped which indicated that the foam began to collapse thereby forming treatment solution.

When brine was injected into the core after the foam test, the differential pressure decreased and soon reached a constant level. The permeability measured at the end of the experiment was only slightly lower as compared to at start. This indicates that that very little damage was caused to the core.

Use of a Foam During Placement of Scale Dissolver

These experiments were designed to test if a foamed scale dissolver that can dissolve sulfate scale can be formed.

Core Material and Fluids

Fluids

The composition of the Heidrun Formation water (HFW) is given in Table 7. The pH was adjusted to 5.9 using 100% acetic acid.

TABLE 7

| Heidrun formation water composition | |
|---|---|
| Ion | Concentration (g/l) |
| NaCl | 44.23 |
| KCl | 0.59 |
| $CaCl_2 \cdot 2H_2O$ | 3.63 |
| $MgCl_2 \cdot 6H_2O$ | 1.92 |
| $SrCl_2 \cdot 6H_2O$ | 0.30 |
| $BaCl_2 \cdot 2H_2O$ | 0.25 |
| $NaHCO_3$ | 0.33 |

The stock tank oil (STO) used was from Heidrun well.

The scale dissolver used was SD250, corresponding to NOXOL 771.

The surfactant used was APG 325.

The Mutual solvent was Musol (2-butoxyethanol).

Core Material and Preparation

Sand packs were made up by packing ⅓ of their length with a mixture of 10 g of Heidrun scale and 243.7 grams of Baskarp sand (no. 25). The rest of the sand pack was made up by pure Baskarp sand.

Mixing of the Baskarp sand and field scale from Heidrun well A-28 was performed in the following manner:

1. The field scale was crushed and sized in a Fritsch BMBH Analysensieb DIN 4188 sizer. The fraction with diameter <0.56 mm and w (maschenweite) <1 mm was used.
2. The scale was placed into a one-liter bottle.
3. The Baskarp sand was transferred into the bottle with scale particles.
4. The bottle was turned upside down 40 times in order to obtain a homogeneous mixture.
5. The mixture was transferred into a Viton sleeve in batches of approximately 50 ml. Between each transfer the mixture was compacted by hand using a large Teflon dowel.

A wire-mesh grid (0.09×0.09 mm) was placed on the inlet and outlet end pieces. The sleeve was then mounted into a core holder and tested for leakage using N2. After the leakage test N2 was replaced with viscous oil.

The pore volume (PV) of the sand pack was deduced from the volumes of brine injected into evacuated sand pack. The permeability of the sand pack was measured at this stage.

Figure 7:
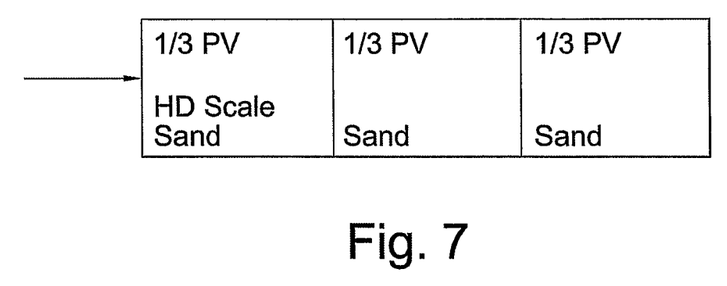
FIG. 7 is a schematic of the sand pack used to test whether a foam comprising scale dissolver can be formed.

A simple illustration of the sand pack used in the dynamic testing of the scale dissolvers can be seen in FIG. 7. The first ⅓ pore volume (PV), seen in the flow direction, consists of both Heidrun (HD) scale and sand. The next two sections, each with a volume of ⅓ PV, only consists of sand. Each injection of scale dissolver solution will have a volume of ⅓ PV and will be followed by a shut in period. After a total of three injections, the sand pack will be filled up with scale dissolver solution and one can back produce the liquid in the opposite direction. This is done in order to more closely resemble the actual situation in the well during the treatment.

Experimental

The following flooding experiments were performed at 85° C. and 100 bar.

SD250 and no foaming (Experiment 1).

Foaming of SD250 with 75% foam quality (Experiment 2).

Foamed pre-flush of Musol+foaming of SD250 with 75% foam quality (Experiment 3)

Foaming of SD250 with 50% foam quality (Experiment 4)

Saturation Procedure

Details of the different sand packs are given in Table 8.

The sand pack was evacuated and formation water was pumped in at 85° C. $S_{wi}$ was established by injecting stock tank oil from the top of the sand pack. $S_{orw}$ was obtained by injecting formation water from the bottom of the sand pack. The core holder was mounted vertically with the scale at the bottom. The differential, injection and outlet pressures were monitored during the experiment. Volume injected fluid, volume effluent, core temperature and the temperature at the in- and outlet were also logged. The STO was injected into the sand pack through a 25/35 μm filter.

TABLE 8

| Details of the different sand/scale packs. | | | |
|---|---|---|---|
| Sand pack | PV (ml) | $S_{orw}$ (%) | $K_w$ at $S_{orw}$ (D) |
| Experiment 1 | 181 | 20 | 2.85 |
| Experiment 2 | 185 | 18 | 2.64 |
| Experiment 3 | 179 | 19 | 2.53 |
| Experiment 4 | 164 | 21 | 2.37 |

Injection of Foam

In experiments 1 to 3, the foam was made by injection of 75% vol nitrogen and 25% vol dissolver of the total at a rate of 2 ml/min.

In experiment 4, the foam was made by injection of 50% vol nitrogen and 50% vol dissolver of the total at a rate of 2 ml/min.

Flooding Programme for Experiments

Experiment 1—The dissolver was 50 vol % SD250 in 6 wt % NaCl. The sand pack was at $S_{orw}$.

Experiment 2—The dissolver was 98 vol % SD250 with 2 vol % surfactant. The sand pack was at $S_{orw}$.

Experiment 3—The pre-flush was 10 vol % Musol in 6 wt % NaCl with 2 vol % surfactant. The dissolver was 98 vol % SD250 with 2 vol % surfactant. The sand pack was at $S_{orw}$.

Experiment 4—The dissolver was 98 vol % SD250 with 2 vol % surfactant. The sand pack was at $S_{orw}$.

1. The sand pack was flooded with 2 PV of brine at 2 ml/min. In the case of experiment 3, 0.27 PV of a foamed pre-flush with Musol was then injected at a rate of 2 ml/min.

2. 0.27 PV of dissolver/foamed dissolver was injected at a rate of 2 ml/min from the bottom of the sand pack.

3. The sand pack was shut in for 150 minutes. 4. 5 ml effluent sample was taken by injection of brine at 1 ml/min from the top of the sand pack. This sample was analysed for $Ba^{2+}$ and $Ca^{2+}$ (see Table 9 below).

5. 0.27 PV of dissolver/foamed dissolver was injected at a rate of 2 ml/min from the bottom of the sand pack.

6. The sand pack was shut in for 150 minutes.

7. 5 ml effluent sample was taken by injection of brine at 1 ml/min from the top of the sand pack. This sample was analysed for $Ba^{2+}$ and $Ca^{2+}$ (see Table 9 below).

8. 0.27 PV of dissolver/foamed dissolver was injected from the bottom of the sand pack at a rate of 2 ml/min.

9. The sand pack was shut in for 150 minutes.

10. 5 ml effluent sample was taken by injection of brine at 1 ml/min from the top of the sand pack. This sample was analysed for $Ba^{2+}$ and $Ca^{2+}$ (see Table 9 below).

11. The sand pack was injected with brine at 2 ml/min from the top of the sand pack several and consecutive 10 ml samples of effluent were taken. The total scale returned during this flow back was determined (see Table 10 below).

12. The heating was turned off.

Results and Discussions

Figure 8:
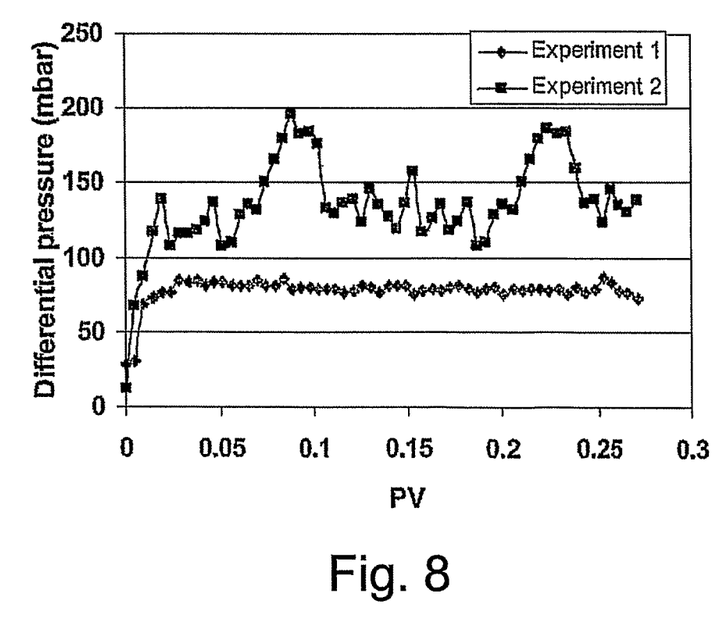
FIG. 8 shows the differential pressure of the sand pack during injection of a scale dissolver and a foam comprising scale dissolver.

The differential pressure during injection of ⅓ PV of SD250 in each of experiments 1 to 3 is displayed in FIG. 8. The average differential pressure during experiment 1 and 2 was 75 and 150 mbar respectively which indicates that a foam was formed in experiment 2. Differential pressure was even higher in experiment 3 which indicates that a foam was also formed in this experiment.

The results from the analysis of the dissolution kinetics of SD250 are given in Table 9.

TABLE 9

| | $Ba^{2+}$ (mg) | | | $Ca^{2+}$ (mg) | | |
|---|---|---|---|---|---|---|
| Hours | Exp1 | Exp2 | Exp3 | Exp1 | Exp2 | Exp3 |
| 2.5 | 2412 | 353 | <LOD* | 471 | 235 | 500 |
| 5.0 | 3588 | 2471 | <LOD | 235 | 118 | 375 |
| 7.5 | 3824 | 5765 | <LOD | 235 | 59 | 250 |
| Tot$_{kin}$ | 9824 | 8588 | | 941 | 412 | 1125 |

(* Limit of detection)

The results show that a foam comprising scale dissolver can be formed and that the dissolver will remove scale.

For experiments 1 and 2 there is only a minor difference in the total amount of $Ba^{2+}$ dissolved but in experiment 3 little $Ba^{2+}$ seems to be dissolved. Too much gas may reduce the ability to dissolve some scales. This was investigated in experiment 4 described below wherein the amount of gas was reduced (gas quality=50%).

On the other hand, use of a foamed scale dissolver, particularly in conjunction with a foamed mutual solvent, enables an increased amount of $Ca^{2+}$ to be dissolved compared to the liquid treatment.

TABLE 10

| | $Ba^{2+}$ (mg) | | | | $Ca^{2+}$ (mg) | | | |
|---|---|---|---|---|---|---|---|---|
| Hours | Exp 1 | Exp 2 | Exp 3 | Exp 4 | Exp 1 | Exp 2 | Exp 3 | Exp 4 |
| 2.5 | 2412 | 353 | <LOD | | 471 | 235 | 500 | |
| 5.0 | 3588 | 2471 | <LOD | | 235 | 118 | 375 | |
| 7.5 | 3824 | 5765 | >LOD | | 235 | 59 | 250 | |
| Tot$_{kin}$ | 9824 | 8588 | | | 941 | 412 | 1125 | |
| Tot$_{return}$ | 32418 | 15146 | 5400 | 33920 | 25562 | 49365 | 38142 | 6380 |
| Total | 42242 | 23734 | 5400 | 33920 | 26503 | 49777 | 39267 | 6380 |

The results show that a foam comprising a scale dissolver will dissolve scale. The dissolving power of the scale dissolver may in some cases be reduced compared to the same scale dissolver in solution, but this disadvantage is outweighed by the fact that a foam comprising scale dissolver can be diverted to otherwise inaccessible areas of a formation. Moreover the dissolving power of foamed scale dissolver can be increased by reducing the amount of gas present in the foam. This increases the amount of water phase present and thus enhances dissolution of scale (e.g. $Ba^{2+}$ ions).

The invention claimed is:

1. A method for treating a hydrocarbon-producing geological formation, said method comprising:
   providing a foam that includes a scale treatment agent and an alkyl polyglycoside foaming agent;
   placing the foam into the hydrocarbon-producing geological formation, causing the foam to remain stable within the hydrocarbon-producing geological formation, and then causing the foam to form a liquid within the hydrocarbon-producing geological formation, and wherein the foam has a static half life of at least 3 minutes and forms a liquid within 1-15 minutes of being placed in the hydrocarbon-producing geological formation, and wherein the liquid includes the scale treatment agent;
   shutting said scale treatment agent in said hydrocarbon-producing geological formation for at least 0.5 hour; and
   subsequently, removing the liquid from the hydrocarbon-producing geological formation.

2. A method as claimed in claim 1, wherein said scale treatment agent removes and/or prevents scale.

3. A method as claimed in claim 1, wherein said scale treatment agent is a scale dissolver, a scale inhibitor or a mixture thereof.

4. A method as claimed in claim 1, wherein said foam comprises a gas.

5. A method as claimed in claim 1, wherein said alkyl polyglycoside is a compound of formula I: $R^1O(R^2O)_a(X)_b$ (I), wherein $R^1$ is $C_{6-30}$ alkyl group, $R^2$ is an alkylene group having from 2 to 4 carbon atoms, X is a saccharide residue having 5 or 6 carbon atoms, a is an integer having a value of 0 to 12, and b is an integer having a value of 1 to 6, or mixtures thereof.

6. A method as claimed in claim 1, wherein said foam comprises water.

7. A method as claimed claim 1 wherein said foam comprises a scale inhibitor.

8. A method as claimed in claim 7 wherein said scale inhibitor is a polymer formed from monomers of formula (II):

wherein $R^3$ is —$CO_2Z$, —$SO_3Z$, —$PO_3Z_2$ or an alkyl or aryl group substituted with at least one —$CO_2Z$, —$SO_3Z$ or —$PO_3Z_2$ group in which Z is a hydrogen atom or a univalent metal atom; $R^4$, $R^5$ and $R^6$ are each independently hydrogen, an optionally substituted alkyl or aryl group having from 1 to 6 carbon atoms or a group $R^3$ as hereinbefore defined.

9. A method as claimed in claim 1, wherein said foam comprises a scale dissolver.

10. A method as claimed in claim 9, wherein the scale dissolver comprises potassium carbonate and ester of an aliphatic carbonic acid.

11. A method as claimed in claim 1, wherein said foam has a static half life of 3 to 20 minutes.

12. A method as claimed in claim 1, further comprising a pre-flush.

13. A method as claimed in claim 1, further comprising an after-flush.

* * * * *